(12) United States Patent
Chang

(10) Patent No.: US 7,286,932 B2
(45) Date of Patent: Oct. 23, 2007

(54) METHOD FOR AUTOMATICALLY EXECUTING NAVIGATION SOFTWARE

(75) Inventor: Pei-Neng Chang, Taipei County (TW)

(73) Assignee: Mitac International Corp., Taoyuan (TW)

( * ) Notice: Subject to any disclaimer, the term of this patent is extended or adjusted under 35 U.S.C. 154(b) by 278 days.

(21) Appl. No.: 10/906,745

(22) Filed: Mar. 4, 2005

(65) Prior Publication Data

US 2005/0216194 A1   Sep. 29, 2005

(30) Foreign Application Priority Data

Mar. 9, 2004   (TW)   ................................ 93106118 A

(51) Int. Cl.
*G01C 22/00*   (2006.01)
(52) U.S. Cl. .................... 701/213; 701/23; 342/357.06
(58) Field of Classification Search .................. 701/23, 701/25–26, 200, 208, 213–214; 342/357.06, 342/357.12, 357.13; 340/988
See application file for complete search history.

(56) References Cited

U.S. PATENT DOCUMENTS

| 6,308,177 | B1* | 10/2001 | Israni et al. ................. 707/100 |
| 6,647,340 | B1* | 11/2003 | Pemble et al. .............. 701/214 |
| 7,200,804 | B1* | 4/2007 | Khavari et al. ............. 715/513 |
| 2007/0027628 | A1* | 2/2007 | Geelen ........................ 701/213 |

* cited by examiner

*Primary Examiner*—Yonel Beeaulieu
(74) *Attorney, Agent, or Firm*—Jianq Chyun IP Office

(57) ABSTRACT

A method for automatically executing a navigation software is provided. After a GPS device is activated, the GPS device receives a GPS satellite signal indicating a current location and decodes the received signal. Then, longitude/latitude data are obtained from the decoded GPS satellite signal by the GPS device. Then, corresponding navigation software is searched in the GPS device based on the longitude/latitude data. Finally, the found navigation software is executed, and the map data corresponding to the longitude/latitude data are automatically loaded. The method provided by the present invention is more user-friendly and the time spent in manually searching and calling the navigation software and loading the map data is effectively saved.

19 Claims, 2 Drawing Sheets

METHOD FOR AUTOMATICALLY EXECUTING NAVIGATION SOFTWARE

CROSS-REFERENCE TO RELATED APPLICATION

This application claims the priority benefit of Taiwan application serial no. 93106118, filed on Mar. 9, 2004.

BACKGROUND OF THE INVENTION

1. Field of the Invention

The present invention relates to a method for executing a navigation software, and more particularly, to a method for automatically executing a navigation software and loading the map data based on the received longitude/latitude data while the Global Positioning System (GPS) is activated.

2. Description of the Related Art

In 1973, the US Department of Defense started developing a precise satellite navigation and positioning project, called Global positioning system (GPS), which would cost over 12 billion US dollars and take more than 20 years. The first GPS satellite was launched in 1978, and 3D, all-weather positioning operation has been formally introduced since October 1993. The development of the GPS is only for supporting the military aviation and airplane requirements. Thus, the GPS user can receive signals from 4~8 satellites anytime and anywhere on the earth simultaneously for positioning the current location in any weather condition if not blocked by any landform or construction.

GPS is mainly composed of three segments as follows.

1. Space satellite segment: this segment is composed of 24 satellites running in 6 orbits 20200 KM above the earth and circulating the earth once about every 12 hours. Each satellite continuously transmits radio waves carrying orbit data and timing information of the satellite to be applied by various receivers on earth.

2. Ground control segment: this segment is mainly the ground control station configured for tracking and controlling the satellite operations mentioned above. It is mainly responsible for modifying and maintaining various parameter information required for normal operation of each satellite, such that each satellite is certain to provide accurate information to be received by the user's receiver.

3. User receiver segment: this segment is configured to track all GPS satellites and to calculate a coordinate of current location, a moving speed, and a timing of the receiver in real time, and the GARMIN GPS belongs to this segment. Only the third segment can be owned and applied by the public. The calculation is based on the following theory: when the satellite is running in the air above the earth, there is a corresponding coordinate value to represent its current location (i.e. a known value), while the coordinate value of the receiver's location is unknown. The time spent in transmitting the message sent by the satellite is calculated by comparing the satellite's clock with the receiver's clock, and the distance between the satellite and the receiver is obtained by multiplying the time difference mentioned above by an electric wave transmission speed (i.e. the light speed), such that a correlated equation can be generated based on the triangle vector relationship.

The GPS is becoming more popular now. People like to carry an electronic device supporting the GPS function while traveling, and the electronic device may store a navigation software and a set of map data for multiple countries or the area (such as a certain state or province) of a specific country. Therefore, it would come in handy when the user rents a car in a specific country trying not to get lost. However, when the user is crossing through states or provinces, they might have to stop the car and manually execute the navigation software and the map data according to the current location, which is very time consuming and not user friendly. In addition, if the user is not familiar with the geographic location, he would be not sure which navigation software and the map data to use with the current location.

SUMMARY OF THE INVENTION

Therefore, it is an object of the present invention to provide a method for automatically executing a navigation software, wherein the navigation software is automatically executed and the map data are loaded based on the longitude/latitude data when the GPS is activated.

It is another object of the present invention to provide a method for automatically executing a navigation software, wherein a corresponding navigation software is automatically sought and executed and its map data are loaded based on the longitude/latitude data of the current location when the vehicle is out of the current navigation map data.

The present invention provides a method for automatically executing a navigation software. The method comprises the following steps. First, a GPS device is activated, and the GPS device receives a GPS satellite signal representing the current location and then decodes the received satellite signal. Then, a longitude/latitude data are obtained from the decoded GPS satellite signal by the GPS device, and a corresponding navigation software is searched in the GPS device based on the longitude/latitude data. Finally, the navigation software is executed.

In accordance with an embodiment of the present invention, the method for automatically executing the navigation software further comprises: searching the corresponding navigation map data in the navigation software based on the longitude/latitude data and loading the navigation map data after the navigation software is executed.

The present invention further provides a method for automatically executing a navigation software suitable for a GPS device executing a first navigation software. The method for automatically executing the navigation software comprises loading a first navigation map data when the first navigation software is being executed. The GPS device receives longitude/latitude data in a constant frequency and determines whether the longitude/latitude data fall in a range of the first navigation map data or not. Then, when the longitude/latitude data are outside the range of the first navigation data, a corresponding second navigation software is searched in the GPS device based on the longitude/latitude data, and the found second navigation software is executed.

In accordance with an embodiment of the present invention, the method for automatically executing the navigation software mentioned above further comprises: searching a corresponding second navigation map data from the second navigation software based on the longitude/latitude data and loading the found second navigation map data.

In accordance with an embodiment of the present invention, the step of receiving the longitude/latitude data in a constant frequency comprises: receiving a GPS satellite signal, decoding the received GPS satellite signal, and obtaining a longitude/latitude data from the decoded GPS satellite signal by the GPS device.

With the method for automatically executing the navigation software provided by the present invention, when the user activates the GPS device in a new area, the GPS device executes the corresponding navigation software and loads its map data automatically based on the received longitude/latitude data. Thus, the present invention is more user-friendly and the time spent for manually searching and calling the navigation software is saved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
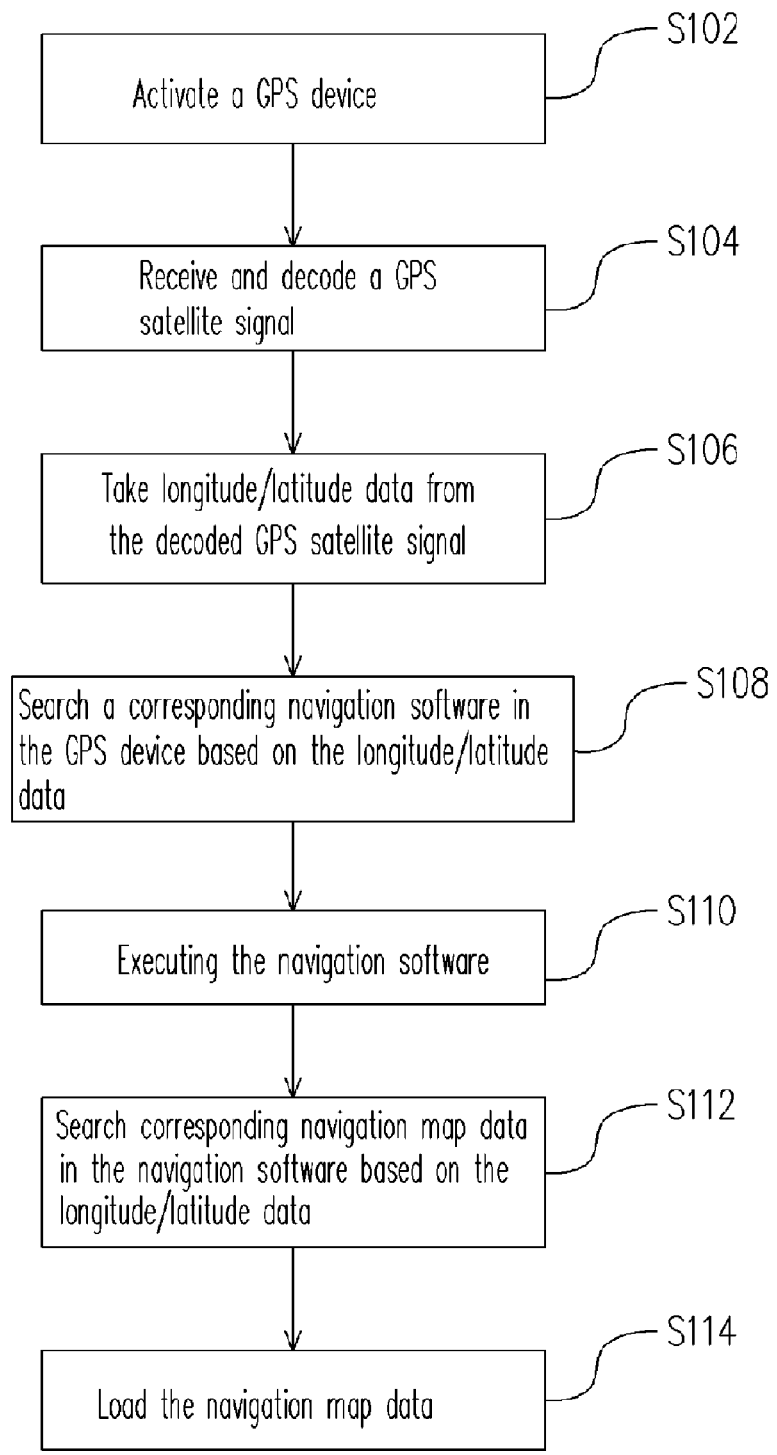
FIG. 1 schematically shows a flow chart illustrating a method for automatically executing a navigation software according to an embodiment of the present invention.

FIG. 1 schematically shows a flow chart illustrating a method for automatically executing a navigation software according to an embodiment of the present invention. The method is suitable for all electronic products having the GPS function. It will be apparent to one of ordinary skilled in the art that the electronic device mentioned above may be a Personal Digital Assistant (PDA), a Personal Computer (PC), or any other electronic products supporting the GPS function.

In the present embodiment, when the user activates the GPS device (s102), the GPS device starts to search the satellites above the earth, and starts to receive the GPS satellite signals sent by the satellite after at least four satellites had been found. In addition, the GPS satellite signal is decoded by a circuit in the GPS device (s104).

The GPS device usually lists a correlated equation based on the triangle vector relationship, and the equation is then used to calculate a coordinate data of current location. Each time a satellite signal is received, a correlated equation is listed. Therefore, a plane coordinate value (i.e. the longitude/latitude data) is calculated after at least three satellite signals had been received. Altitude information is added after the fourth satellite is received, and the accuracy is enhanced after five or more than five satellite signals had been received.

In the present embodiment, after step s104 is executed, longitude/latitude data are taken from the decoded GPS satellite signal (s106). It will be apparent to one of ordinary skilled in the art that the longitude/latitude data may be a longitude, a latitude, a longitude division, and a latitude division, but not limited thereto.

After the longitude/latitude data of current location are received, the corresponding navigation software is searched by the GPS device based on the longitude/latitude data (s108), then the navigation software is executed (s110). The multiple navigation software for different countries and different areas or multiple navigation software for one specific area may be stored in the GPS device. In addition, after the corresponding navigation software has been found, one of the navigation software may be selected by the user or by the GPS device for further execution, but not limited thereto.

In the present embodiment, after step s110 is executed, the corresponding navigation map data are searched in the navigation software by the GPS device based on the longitude/latitude data (s112). Then, the found navigation map data corresponding to the longitude/latitude data are loaded into the navigation software (s114), and the current location is displayed on a screen of the GPS device.

In an embodiment of the present invention, a two-dimensional coordinate system, i.e. a so-called 2D navigation mode, can be defined by three or more than three visible satellites (the satellites found by the GPS device). A three-dimensional coordinate system, i.e. a so-called 3D navigation mode, can be defined by four or more than four satellites.

Figure 2:
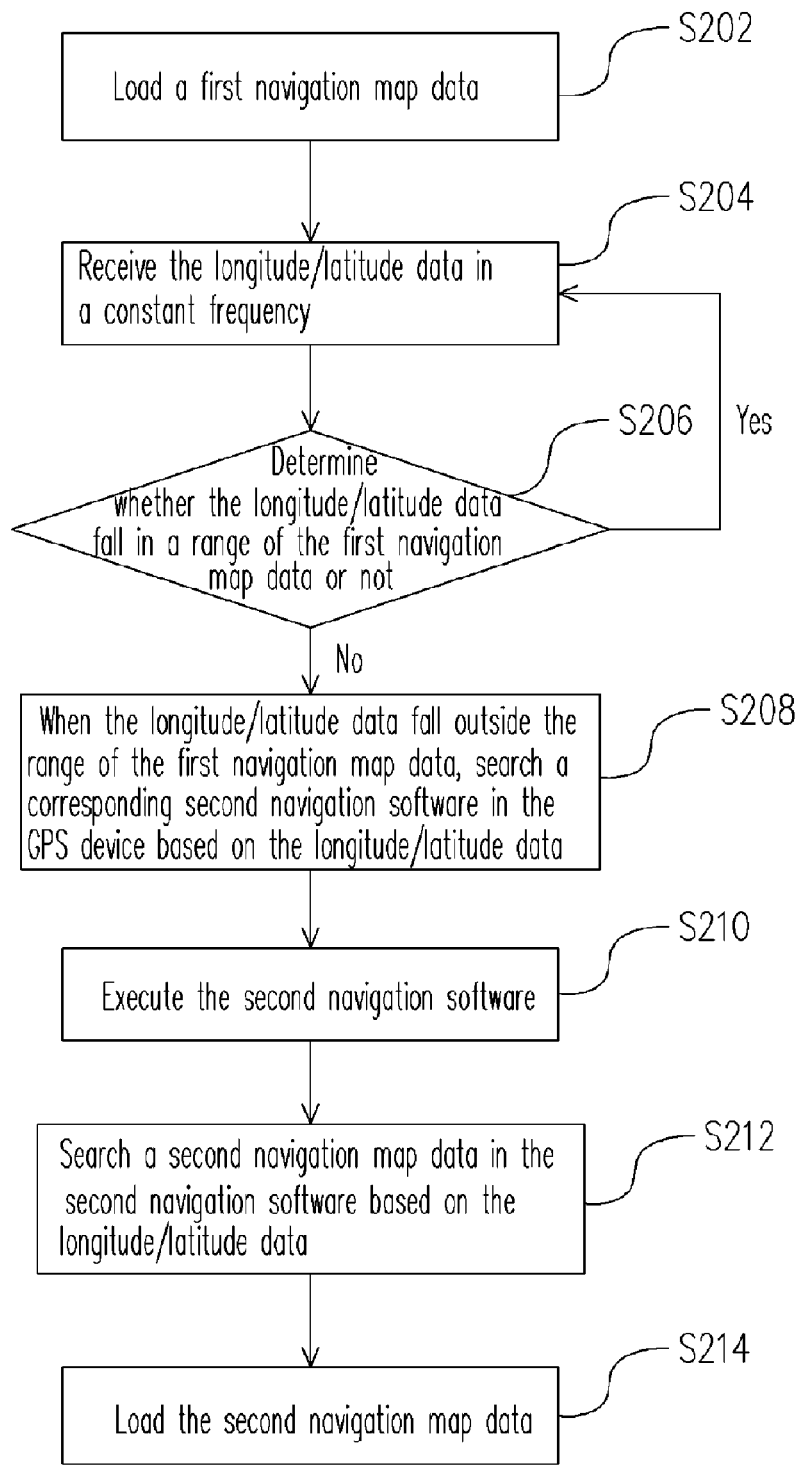
FIG. 2 schematically shows a flow chart illustrating another method for automatically executing a navigation software according to an embodiment of the present invention.

FIG. 2 schematically shows a flow chart illustrating another method for automatically executing a navigation software according to an embodiment of the present invention. In the present embodiment, the method of FIG. 2 can be applied in the navigation software which needs to be switched while the vehicle is moving (the vehicle is crossing from one country to another country or driving through states or provinces).

In the present embodiment, as shown in the steps of FIG. 1 mentioned above, when the GPS device is executing a first navigation software, the first navigation map data corresponding to the longitude/latitude data of current location is automatically loaded by the GPS device (s202). In addition, in order to display the moving direction and current location of the vehicle on the first map data on the screen of the GPS device in real time, the GPS device would receive the longitude/latitude data sent form the satellites in a constant frequency (s204).

It will be apparent to one of ordinary skilled in the art that the constant frequency can be, for example, receiving the newest longitude/latitude data once every second, but not limited thereto. When the GPS device receives the longitude/latitude data sent form the satellites in a constant frequency, the step of receiving, decoding, and obtaining the longitude/latitude data is the same as the steps s104 to s106 of FIG. 1 mentioned above, thus details are not repeated herein.

In the present embodiment, after the newest longitude/latitude data had been received, the GPS device determines whether the received newest longitude/latitude data fall within the range of the first map data or not (s206) to avoid the situation that the navigation software on the GPS device does not include the map data to display when the driver focuses on the traffic.

When it is determined by the GPS device that the newest longitude/latitude data fall outside the first map data, a second navigation software corresponding to the newest longitude/latitude data is searched in a storage device of the GPS device based on the newest longitude/latitude data (s208), and then the found second navigation software is executed (s210). Otherwise, when it is determined by the GPS device that the newest longitude/latitude data fall within the range of the first map data, the process goes to step s204 to determine whether the next record of the longitude/latitude data fall within the range of the first map data or not.

After step s210 is executed, a corresponding second navigation map data are searched in the second navigation software by the GPS device based on the longitude/latitude data (s212), and then the found navigation map data corresponding to the longitude/latitude data are loaded into the navigation software (s214), and the current location is displayed on the screen of the GPS device.

In an embodiment of the present invention, different design may be applied on different GPS device depending on how the GPS device applies the data in the GPS signal. Some of the GPS devices can receive the hidden data and satellite message contained in the received code (so-called code receiver), and some do not need to use the code (so-called codeless receiver). Here, the former directly receives the satellite message and code data for navigating and positioning purpose in real time, and the latter requires a post-processed satellite calendar for normal operation, thus it cannot be applied in real time positioning measurement. In addition, if the GPS device receives dual-frequency (L1 and L2) data, the ion layer reflection effect can be eliminated.

In an embodiment of the present invention, the GPS satellite signal comprises National Marine Electronics Association (NMEA) communication protocol data. The NMEA communication protocol data comprise the following information: 1. a longitude; 2. a latitude; 3. a symbol indicating the positioning is completed; 4. a quantity of valid satellites; 5. an ID, an elevation, an azimuth, and a received signal strength of the satellite; 6. an azimuth of the satellite; 7. an altitude information; 8. a relative shift velocity; 9. a relative shift direction; 10. a date information 11. a UTC (Coordinated Universal Time), also known as Greenwich Mean Time (GMT time); 12. a DOP (Dilution of Precision) error reference value; 13. a satellite status and a receiving status; 14. a NMEA-0183 output information table; 15. a NMEA type; 16. a GGA satellite positioning information; 17. a GLL based geography location—longitude and latitude; 18. a GSA GNSS DOP; 19. a plurality of satellites in the GSV GNSS space range; 20. a RMC (Recommended Minimum Specific), i.e. a minimum transmission data recommended by the GPS; and 21. a VTG (Vector to Ground), i.e. a relative shift direction and a shift velocity.

In an embodiment of the present invention, the GGA (i.e. satellite positioning information) is represented by the following format:

$GPGGA,<1>,<2>,<3>,<4>,<5>,<6>,<7>,<8>,<9>, M,<11>,<12>,<13><CR><LF>

<1> represents an UTC time format: hhmmss.sss; <2> represents a latitude format: ddmm.mmmm; <3> represents a latitude division indicating either the Northern hemisphere (N) or the South hemisphere (S); <4> represents a longitude format: ddmm.mmmm; <5> represents a longitude division indicating either the Eastern hemisphere (E) or the Western hemisphere (W); <6> represents an ID indicating the positioning status, where 0=un-positioned or invalid position, 1=GPS SPS format (where SPS is a format for commercial use), having been positioined, 3=GPS PPS format (where PPS is a format for military use), having been positioned; <7> represents a quantity of satellites currently used from 00 to 12; <8> represents a horizontal DOP (Dilution of Precision) from 0.5 to 99.9 meters; <9> represents an MSL altitude from −9999.9 to 99999.9 meters; <10> represents a Geoidal altitude from −999.9 to 9999.9 meters; <11> represents an expiration limit of the deviation modification DGPS (RTCM SC-104), that is the total number of seconds elapsed since the previous valid RTCM transmission (it is 0 if not DGPS); <12> represents an ID of the deviation modification (DGPS) reference base station from 0000 to 1023, where 0 indicates non DGPS status; and <13> represents a checksum.

In an embodiment of the present invention, the GLL, the geographic location including longitude and latitude is represented in the following format:

$CPGLL,<1>,<2>,<3>,<4>,<5>,<6>,<7><CR><LF>

<1> represents a latitude format: ddmm.mmmm; <2> represents a latitude division indicating either the Northern hemisphere (N) or the South hemisphere (S); <3> represents a longitude format: ddmm.mmmm; <4> represents a longitude division indicating either the Eastern hemisphere (E) or the Western hemisphere (W); <5> represents an UTC time format: hhmmss; <6> represents a status of information, where A indicates the information is usable, and V indicates the information is unusable; and <7> represents a checksum.

In summary, with the method for automatically executing a navigation software provided by the present invention, the program automatically calls the navigation software in the GPS device and loads the map data corresponding to current location based on the positioned longitude/latitude data when the user is running the GPS device.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for automatically executing navigation software, the method comprising:
   activating a GPS device;
   receiving and decoding a GPS satellite signal;
   obtaining a longitude/latitude data from the decoded GPS satellite signal;
   searching a navigation software in the GPS device that corresponds to the longitude/latitude data; and
   executing the corresponding navigation software.

2. The method for automatically executing the navigation software of claim 1, further comprising:
   searching corresponding navigation map data in the navigation software based on the longitude/latitude data; and
   loading the navigation map data.

3. The method for automatically executing the navigation software of claim 1, wherein the longitude/latitude data comprise a longitude.

4. The method for automatically executing the navigation software of claim 3, wherein the longitude/latitude data further comprise a latitude.

5. The method for automatically executing the navigation software of claim 4, wherein the longitude/latitude data further comprise a longitude division.

6. The method for automatically executing the navigation software of claim 5, wherein the longitude/latitude data further comprise a latitude division.

7. The method for automatically executing the navigation software of claim 1, wherein the GPS satellite signal comprises NMEA (National Marine Electronics Association) communication protocol data.

8. A method for automatically executing navigation software suitable for a GPS device executing a first navigation software, the method comprising:
   loading a first navigation map data;
   receiving a longitude/latitude data in a constant frequency;
   determining whether the longitude/latitude data fall within a range of the first navigation map data or not;
   when the longitude/latitude data fall outside the range of the first navigation map data, searching a corresponding second navigation software in the GPS device based on the longitude/latitude data; and
   executing the second navigation software.

9. The method for automatically executing the navigation software of claim 8, further comprising:
   searching corresponding second navigation map data in the second navigation software based on the longitude/latitude data; and
   loading the found second navigation map data.

10. The method for automatically executing the navigation software of claim 8, wherein the constant frequency is once every second.

11. The method for automatically executing the navigation software of claim 8, wherein the step of receiving the longitude/latitude data in the constant frequency comprises:
   receiving a GPS satellite signal;
   decoding the GPS satellite signal; and
   obtaining the longitude/latitude data from the decoded GPS satellite signal.

12. The method for automatically executing the navigation software of claim 11, wherein the GPS satellite signal comprises NMEA (National Marine Electronics Association) communication protocol data.

13. The method for automatically executing the navigation software of claim 8, wherein the longitude/latitude data comprise a longitude.

14. The method for automatically executing the navigation software of claim 13, wherein the longitude/latitude data further comprise a latitude.

15. The method for automatically executing the navigation software of claim 14, wherein the longitude/latitude data further comprise a longitude division.

16. The method for automatically executing the navigation software of claim 15, wherein the longitude/latitude data further comprise a latitude division.

17. A method for executing navigation software suitable for a GPS device, the method comprising:
   loading a first navigation map data for the navigation software to navigate;
   receiving a longitude/latitude data in a constant frequency; and
   determining whether the longitude/latitude data fall within a range of the first navigation map data or not, when the longitude/latitude data fall outside the range of the first navigation map data, searching a second navigation map data corresponding to the longitude/latitude data, which fall within a range of the second navigation map data for the navigation software to navigate.

18. The method for executing the navigation software of claim 17, wherein the step of receiving the longitude/latitude data in the constant frequency comprises:
   receiving a GPS satellite signal;
   decoding the GPS satellite signal; and
   obtaining the longitude/latitude data from the decoded GPS satellite signal.

19. The method for executing the navigation software of claim 17, wherein the GPS device stores a plurality of navigation map data for the navigation software to navigate.

* * * * *